United States Patent
Gottschald

[11] Patent Number: 5,454,748
[45] Date of Patent: Oct. 3, 1995

[54] PROCESS, BLOCK FOR SUCKER OR A MACHINE FOR GRINDING OR MACHINING THE EDGE OF EYEGLASS LENSES AND A PROCESS FOR GRINDING EYEGLASS LENSES

[75] Inventor: Lutz Gottschald, Meerbusch, Germany

[73] Assignee: Wernicke & C.O. GmbH, Dusseldorf, Germany

[21] Appl. No.: 187,794

[22] Filed: Jan. 26, 1994

Related U.S. Application Data

[63] Continuation-in-part of Ser. No. 939,981, Sep. 3, 1992, abandoned.

[30] Foreign Application Priority Data

Sep. 5, 1991 [DE] Germany ............................ 41 29 463.7
Apr. 30, 1992 [DE] Germany ............................ 42 14 242.3

[51] Int. Cl.⁶ ........................................................ B24B 1/00
[52] U.S. Cl. ................................. 451/41; 451/42; 451/43
[58] Field of Search ................................. 451/41, 42, 43, 451/44, 57, 276, 277, 390

[56] References Cited

U.S. PATENT DOCUMENTS

| | | | |
|---|---|---|---|
| 4,578,230 | 3/1986 | Neefe | 51/284 E |
| 4,686,798 | 8/1987 | Petty | 51/284 R |
| 4,829,715 | 5/1989 | Langlois | 51/284 E |
| 4,870,784 | 10/1989 | Ramos | 51/284 E |
| 4,885,875 | 12/1989 | Soper | 51/284 E |
| 4,908,996 | 3/1990 | Friedman | 51/284 E |
| 5,056,270 | 10/1991 | Curcher | 51/284 E |
| 5,149,337 | 9/1992 | Watanabe | 51/284 R |
| 5,161,333 | 11/1992 | Lecerf | 51/284 E |
| 5,210,695 | 5/1993 | Wood | 451/5 |

Primary Examiner—Maurina T. Rachuba
Attorney, Agent, or Firm—Klein & Vibber

[57] ABSTRACT

A process, a block or sucker, and an apparatus for machining the edge and optionally the optical surfaces of eyeglass lenses. The block or sucker is of circular shape and has a diameter which, at least in some areas, extends beyond the dimensions of the finished outline of the eyeglass lens. The block or sucker is attached to one major surface of the eyeglass lens blank during the machining operation. The block or sucker is inserted in a holder of a device for machining the edge of the eyeglass lens blank. The edge of the eyeglass lens is machined in accordance with the prescribed outline. The block or sucker may be machined at least in certain areas down to the outline of the eyeglass lens itself, whereafter the block of sucker is detached from the completely machined eyeglass lens and disposed of. Prior to edging the eyeglass blank, the optical surface may also be machined using the same block or sucker. The machining of the optical surface and the edge of the eyeglass lens can be performed in separate machines for machining the optical surfaces and for machining the edge of the eyeglass lenses without having to detach the block or sucker from the eyeglass lens blank, however, it is preferable to perform machining in a combined machine in which the optical surfaces and the edge of eyeglass lenses are machined. A CNC control unit is preferably used for electronically controlling the various operations of the apparatus.

2 Claims, 4 Drawing Sheets

PROCESS, BLOCK FOR SUCKER OR A MACHINE FOR GRINDING OR MACHINING THE EDGE OF EYEGLASS LENSES AND A PROCESS FOR GRINDING EYEGLASS LENSES

This application is a continuation-in-part of Ser. No. 939,981 filed Sep. 3, 1992, now abandoned.

BACKGROUND OF THE INVENTION

The invention relates to a block or sucker for a machine used to grind or to machine the edge and possibly the optical surfaces of eyeglass lenses and a process for eyeglass grinding or machining (for plastic lenses a milling machine may be used).

If an optician is to process a pair of eyeglass lenses on the basis of the optical values for the eyeglass lenses given him by the customer, optometrist or ophtamologyst and on the basis of the eyeglass frame selected by the customer, he can order the eyeglass lenses with the prescribed optical values from a manufacturer of eyeglass lenses. Generally the optician keeps keeps a large number of eyeglass lenses of different optical values in stock. This applies to both glass and plastic lenses. The optician then machines the edges in accordance with the frame selected, mounts the finished eyeglass lenses in the eyeglass frame and delivers the finished eyeglasses to the customer.

Blocks made of a metal alloy with a low melting temperature can be used in such eyeglass lens grinding machines. However, these blocks are generally made of plastic. Alternatively suckers can be use. These blocks or suckers have a relatively small diameter, generally smaller than the shortest distance between the edge of the finished eyeglass lens and the optical center of the lens in order to avoid these blocks or suckers protruding into the operating range of the tool used to machine or grind the edge of an eyeglass lens.

In order to reduce the inventory of finished or semi-finished eyeglass blanks which is required to be maintained by an optician to a minimum a practice has recently become popular whereby an inventory of pressed eyeglass lens blanks is only maintained, the major surfaces of which are essentially parallel and one of which surfaces may already be finished. Such semi-finished eyeglass blanks have their optical surfaces machined in accordance with the optical values transmitted by the optician and in response to the order by the optician, whereafter they are delivered to the optician who then performs the edging process. This machining of the optical surfaces is carded out by businesses specialized in this work, on order, so that the need by the optician to maintain an inventory of eyeglass lenses, the optical surfaces of which are finished is dispensed with.

When machining the optical surfaces of an eyeglass lens blank, in contradistinction to finishing the edge the eyeglass lens blank, this operation requires the blank to be held by means cf a block or a sucker interfacing with only a single major surface so that the other major surface is exposed for machining. Such a block or sucker will usually have a diameter which is approximately equal to the diameter of the eyeglass lens blank since the holder for the eyeglass lens must have great strength and stiffness in order to absorb the forces engendered during the machining of the optical surfaces.

A block made of a metal which has a relatively low melting temperature is often used in contacting the optical surfaces. This block is cast on the eyeglass lens blank and adheres firmly to the glass while at the same time exhibiting sufficient strength to be attached securely and without rocking to a holder in the machine for processing the optical surface.

Blocks made of a metal with a low melting temperature can also be used when processing plastic eyeglass lenses. In this case a self-adhesive intermediate film is applied to the plastic eyeglass lens blank and the block is cast on this film. The block can also be made of plastic and be attached to the eyeglass lens blank by vacuum action or with an adhesive.

Once machining of the optical surfaces has been completed the block or sucker used for this purpose is detached from the eyeglass lens and the eyeglass lens is delivered to the optician for edging. In the latter process a block or sucker of appropriately smaller diameter and suitable for edging is again attached to the eyeglass lens blank.

The foregoing description illustrates the complexity of the work to be carried out. Such work is tedious for an optician in both cases, since he will basically have to order the eyeglasses in advance with the prescribed optical values and then fit the eyeglass lenses received with a block or sucker. The latter must be adjusted in accordance with the optical values and in particular in accordance with the angle of the axis of the cylinder (cylinder angle). The adjustment of the eyeglass lens in the eyeglass frame is effected in addition in relation to the interpupillary distance of the person who has selected the glasses. Only then can the machining of the eyeglass lens edge be carried out.

In German published, unexamined patent application No. 15 77 502 (corresponding patent application Ser. No. 430, 315 filed Feb. 4, 1965), on the other hand, a machine is described for processing the optical surfaces and the edge of eyeglass lenses using one and the same cast-in-place block made of a metal alloy with a low melting temperature. This block must however exhibit such a small diameter or must be reduced to such a diameter after the machining of the optical surfaces that the outside surfaces of the block do not come into contact with the edging tool and do not interfere with the edging process. Basically, however, the diameter of the block will from the very outset be smaller than normal, so that there will be an adverse influence on the guidance accuracy during machining of the optical surfaces.

SUMMARY OF THE INVENTION

It is a general object of this invention is to provide a process and an arrangement having a block or sucker for finishing the edge and possibly the optical surfaces of eyeglass lenses with which it possible to machine eyeglasses in a fast and simple manner while avoiding intermediate stages which may reduce the accuracy of the machining process in accordance with the prescribed optical values and the edging of the lens outline in accordance with the selected eyeglass frame.

In accordance with this object the invention therefore provides a process for finishing the edge of eyeglass lenses and optionally their optical surfaces which includes the steps of attaching a block or a sucker to a major surface of the eyeglass lens blank. The block or sucker has a diameter which, at least in certain areas, exceeds the dimensions of the finished eyeglass lens outline; processing the edge of the eyeglass in accordance with the prescribed outline, optionally in conjunction with previous insertion of the block or sucker in a holder of a device for processing the optical surfaces of the eyeglass lens blank; processing the optical surface, and then, without detaching the block or sucker, processing the edge on the same machine or another eyeglass lens edger unit; removing the block or sucker from the finished eyeglass lens; and disposing of the block or sucker.

Advantageously the finishing of the lens edge may include, in addition to the grinding of the lens outline, the formation of a bevel or a groove; whereby the bevel or groove is processed under control referenced to the optical surface and/or the outline of the eyeglass lens. In this way it is possible to guide the bevel or groove exactly with reference to the eyeglass lens so that the block or sucker will exert no influence on the course of the bevel or groove.

Depending on the diameter of the eyeglass lens blank, the diameter of the block or sucker used may be larger than the smallest diameter of the eyeglass lens. The diameter of the block or sucker is preferably equal to or slightly smaller than the diameter of the eyeglass lens blank prior to machining. This ensures secure fixing of the eyeglass lens blank during edging, regardless of the size of its diameter. This also makes it possible to use materials of lower strength for the block or the sucker.

Using a single sucker for processing the optical surfaces and the edge of an eyeglass lens blank will improve considerably the accuracy and speed of processing eyeglass lenses because by dispensing with using blocks or suckers of differing sizes to machine both the optical surfaces and the edge of eyeglasses there is no longer a need to attach twice the eyeglass lens blank to the block or sucker. Accordingly this block or sucker can be dimensioned large enough so that it will exhibit a sufficient size and therefore strength for the machining of the optical surfaces. It is understood that when machining the eyeglass lens edge the block or sucker will be worn away together with the eyeglass lens to the prescribed outline of the eyeglass lens so that the block or sucker cannot be reused. This disadvantage is, however, offset by the advantage found in the fact that the block or sucker for the machining of the optical surfaces and for the machining of the edge of the eyeglass lens need not be changed and that it is therefore even possible to use one and the same machine to process the optical surfaces and the edge of eyeglass lenses.

Even when separate machines are used to a) process the optical surfaces and b) to finish the edge of eyeglass lenses, the advantage is nonetheless retained that the block or sucker on the eyeglass lens, which is used to finish machining the optical surfaces, remains attached to the eyeglass lens, and can be inserted jointly with semi-finished lens, just as it is, in the correct position in a machine for processing the edge of eyeglass lenses.

The block or sucker may be made from a metal alloy, known in the state of the art, with a low melting temperature and which is cast in place in a known operation on the optical surface. Generally a self-adhesive intermediate film is used between the optical surface and the block of low-temperature metal alloy when processing plastic lenses.

The block or sucker can, however, also be fabricated from plastic or preferably from a machinable, natural raw material based, for example, on a vegetable starch, cellulose or its derivatives or animal collagen which is not or only minimally soluble in cold water at least during the machining period or is not subject to swelling.

Blocks or suckers made of moldable natural material offer the advantage that they can be disposed of without difficulty since they can be composted and thus are completely biodegradable. Moreover, such materials are environmentally sound and suitable for the application and do not contribute to the greenhouse effect since they are manufactured from renewable raw materials.

In order to be able to machine both the optical surfaces and the edge of eyeglass lenses in the same machine it is advantageous to mount a device for processing the optical surfaces in axial alignment with the holder for the eyeglass lens blank and to mount axially and parallel to the holder a device for processing the edge of the eyeglass lens. The holder here can preferably be mounted on an arm which can be pivoted about an axis parallel to the rotation axis of the holder, between a position for machining the optical surfaces of the eyeglass lens and a position for machining the edge of the eyeglass lens, so that the eyeglass lens blank can be moved into the particular machining positions in a simple fashion using an automatic control mechanism.

In order to clamp the eyeglass blank between to clamping members when machining the edge of the eyeglass lens it is advantageous to mount a counter clamping shaft coaxially to the holder which can be made to abut axially against the optical surface which has been processed, so that the eyeglass lens is clamped on both sides when the edge of the eyeglass is machined.

BRIEF DESCRIPTION OF THE DRAWING

With these and other objects in view, which will become apparent in the following detailed description the present invention, which is shown by example only, will be clearly understood in connection with the accompanying drawing, in which.

DETAILED DESCRIPTION

Figure 1:
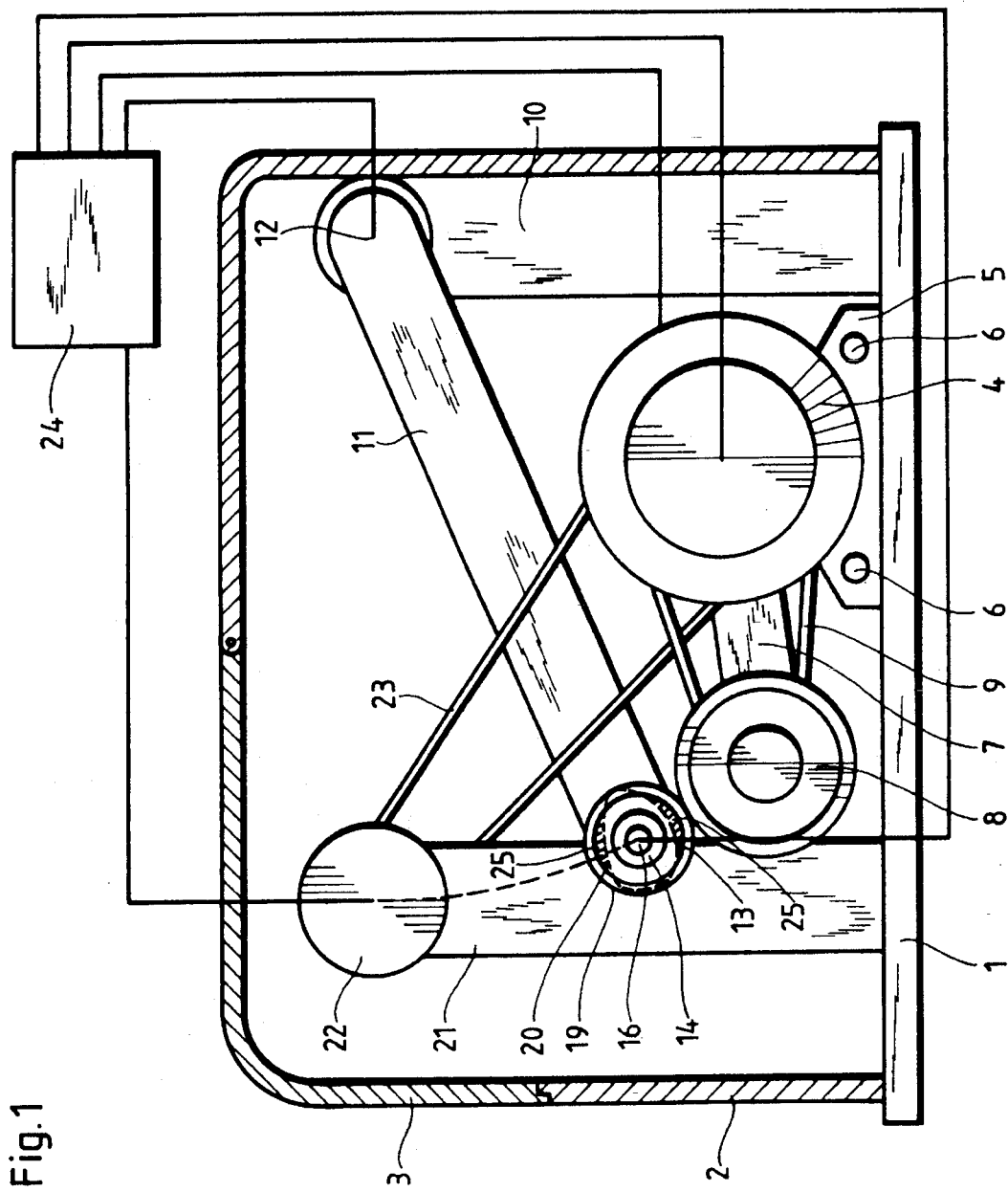
FIG. 1 a schematic cross section through a machine used to process the optical surfaces and the edge of eyeglass lenses.

Referring now to the drawing there is illustrated a machine in accordance with the invention for carrying out the inventive machining process on the optical surfaces and the edge of eyeglass lenses. The machine has a base plate 1, over which a housing 2, on which a swingaway cover 3 is pivotally mounted, rises. Inside the housing 2 a motor 4 is slidably axially movably mounted on the base plate 1 by means of a carriage 5 riding on a pair of guide rods 6. A carrier arm 7, mounted on the carriage 5, rotatably supports an edging tool 8, which includes a known grinding disk or a milling tool, depending on whether glass or plastic lenses are to be processed.

The edging tool 8 is rotatably mounted on the carrier arm 7 and is driven by the motor 4 by means of a drive belt 9.

A pair of parallel supports 10 project upwardly from the base plate 1. A pair of support arms 11 are pivotally mounted on a shaft which is pivotally supported by the parallel supports 10 about an axis 12 and which shaft fixes rigidly together the pair of arms 11. The pair of arms 11 serve as carriers for a block or sucker 13, which is attached by means of an attachment bushing 14 to one shaft 16, which is mounted so as to be rotatable in a sealed bearing in arm 11 in a manner not described in detail here because it is not essential to a full understanding of the invention. An eyeglass lens blank 19 is attached to the block or sucker 13 and moved into the operative range of the edging tool 8 for finishing the edge of the eyeglass lens.

The eyeglass lens blank 19 is held at both of its optical surfaces sides for the machining of the edge. Thus for this operative step the a bilateral clamping is effected by an additional block or sucker 18 which is clamped in place against the eyeglass lens blank 19 by means of an axially shiftable and rotatable second shaft 17 which is also mounted in a sealed bearing in the other arm 11.

A finished eyeglass lens 20 is indicated inside the eyeglass lens blank 19 in FIG. 1 by a dashed line. It can be seen that the crosshatched area 25 of the block or sucker 13 will also have been ground or machined during the finishing of the edge of the eyeglass lens blank 19. This is intentional since it is thereby possible to use one and the same block or sucker 13 both to finish the optical surfaces of the eyeglass lens blank 19 and to machine the eyeglass edge outline to match the selected eyeglass frame.

If the block or sucker 13 is made of a metal alloy with a low melting point it is necessary to adapt the edging tool 8 to accommodate the simultaneous processing of a relatively soft metal and glass or plastic.

The block or sucker 13 can also be fabricated from plastic or from a machinable, natural raw material based, for example, on a vegetable starch or animal collagen which is not or only minimally soluble in cold water or subject to swelling at least during the machining period. When using these materials it may also be necessary to adapt the edging tool 8 to accommodate to the hardness and malleability of this material so that the glass or plastic and the natural raw material are worn away uniformly and evenly without difficulty.

The coupling between the attachment bushing 14 and the block or sucker 13 is preferably achieved by means of conical, grooved splines 15 with angular positioning by means of the appropriate design of the grooved splines 15. Such a coupling is, for example, as described in co-assigned German published utility model specification G 86 05 286. A detailed description of such a coupling is not believed to be essential for a complete understanding of this invention.

An additional support column is mounted on the base plate 1 which projects upwardly near to the swingaway cover 3 on which there is mounted a schematically illustrated tool 22 for machining the optical surfaces. This machining tool 22 can be driven by the motor 4 by means of an additional drive belt 23 or can be driven a separate non-illustrated motor.

The pair of arms 11 is used to move the eyeglass lens blank 19, attached to the block or sucker 13, which is coupled to the shaft 16 by means of the attachment bushing 14, initially into the operative region of the tool 22 for machining the optical surface. The eyeglass lens blank 19 is machined there and subsequently moved by pivoting the pair of arms 11 into the range of the edging tool 8, where the machining of the eyeglass lens blank 19 will be completed.

The machine used to machine the optical surfaces and the edge of eyeglass lenses can be provided with CNC control, as is known in the art, for example by a suitable electronic control unit 24 acting by way of schematically illustrated control lines, thereby ensuring that, after the insertion of an eyeglass lens blank 19, the pair of arms 11 initially are swung into the range of the tool 22 for machining one optical surface of the eyeglass lens blank 19. The control unit 24 controls the machining of the optical surface in accordance with the optical values entered therein. During the processing of the optical surfaces the eyeglass lens blank 19 is generally secured to prevent rotation.

Figure 2:
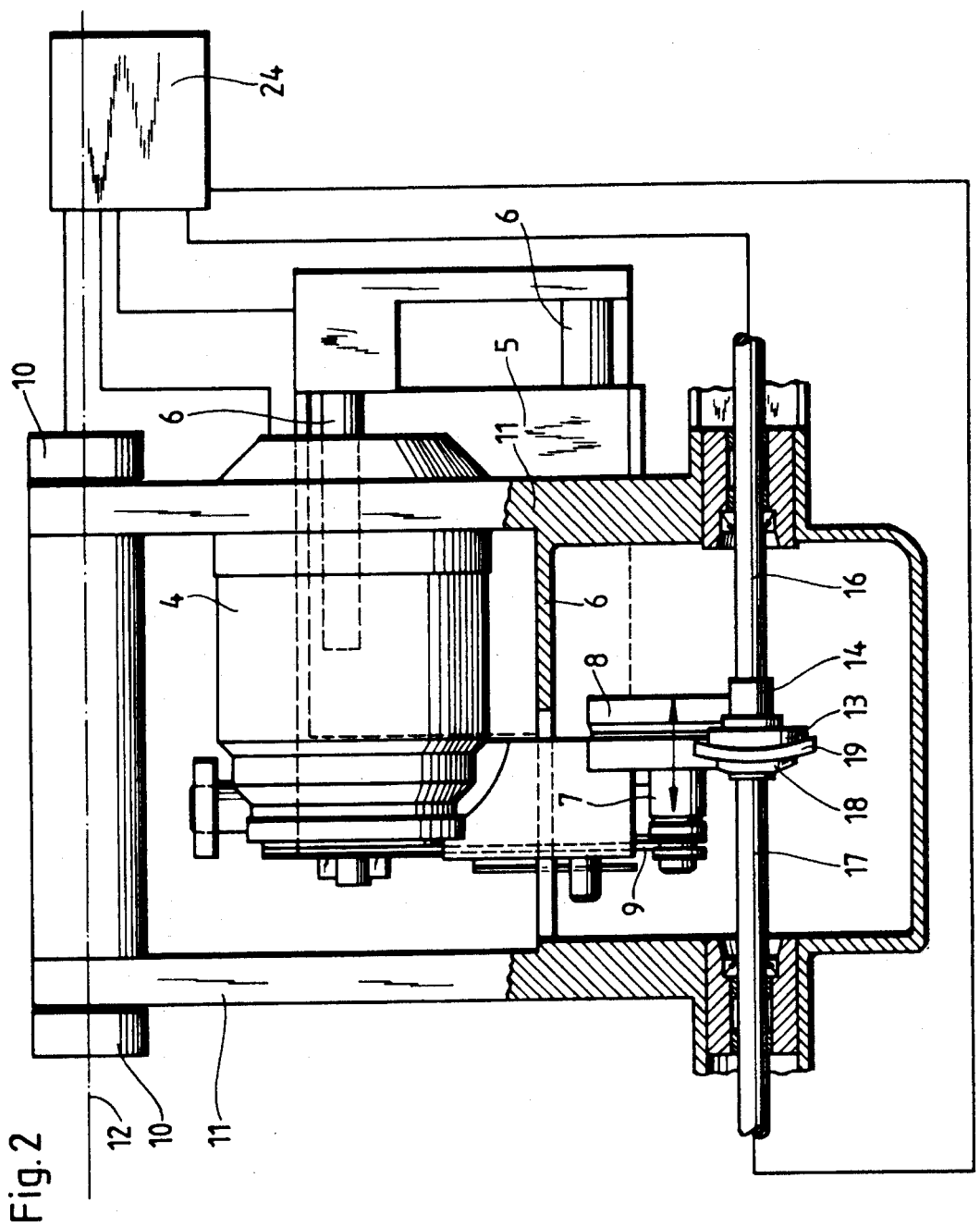
FIG. 2 a schematic top view, partially in section, of the machine illustrated in FIG. 1.
Figure 3:
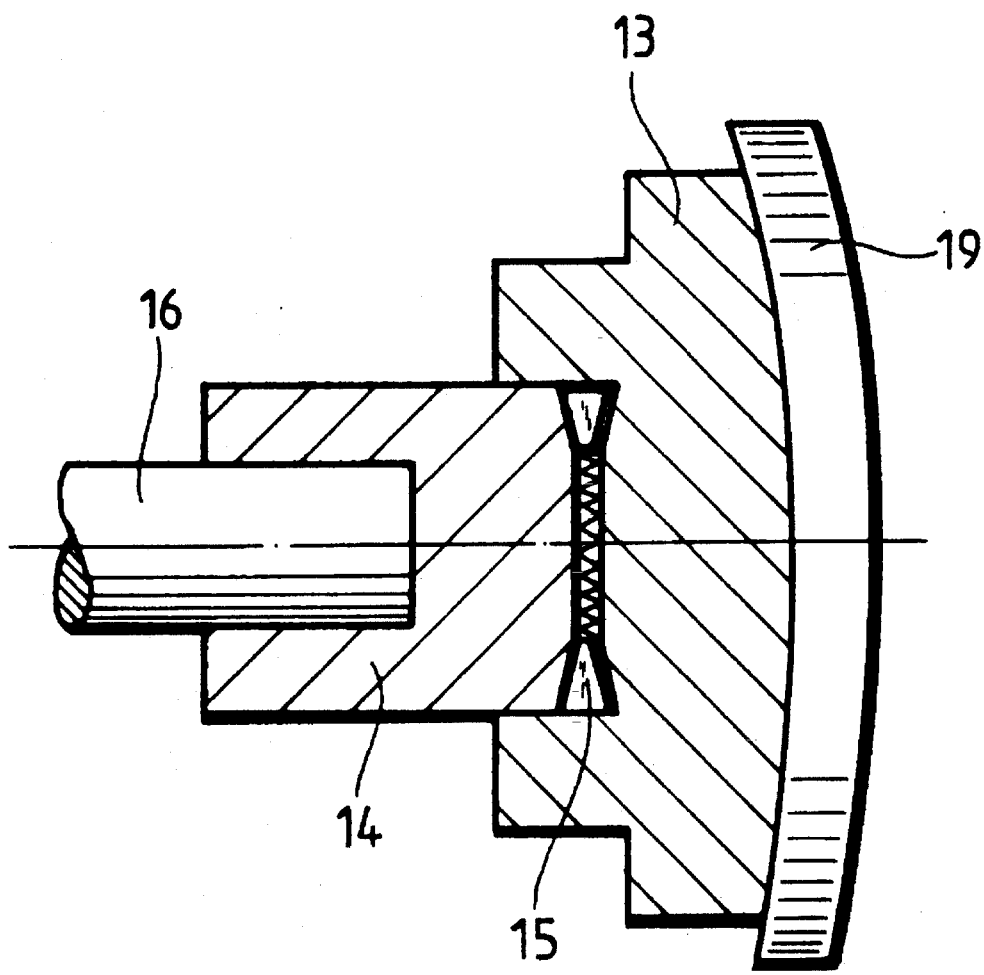
FIG. 3 is a cross-sectional view through a block or sucker, coupled with an attachment bushing.
Figure 4:
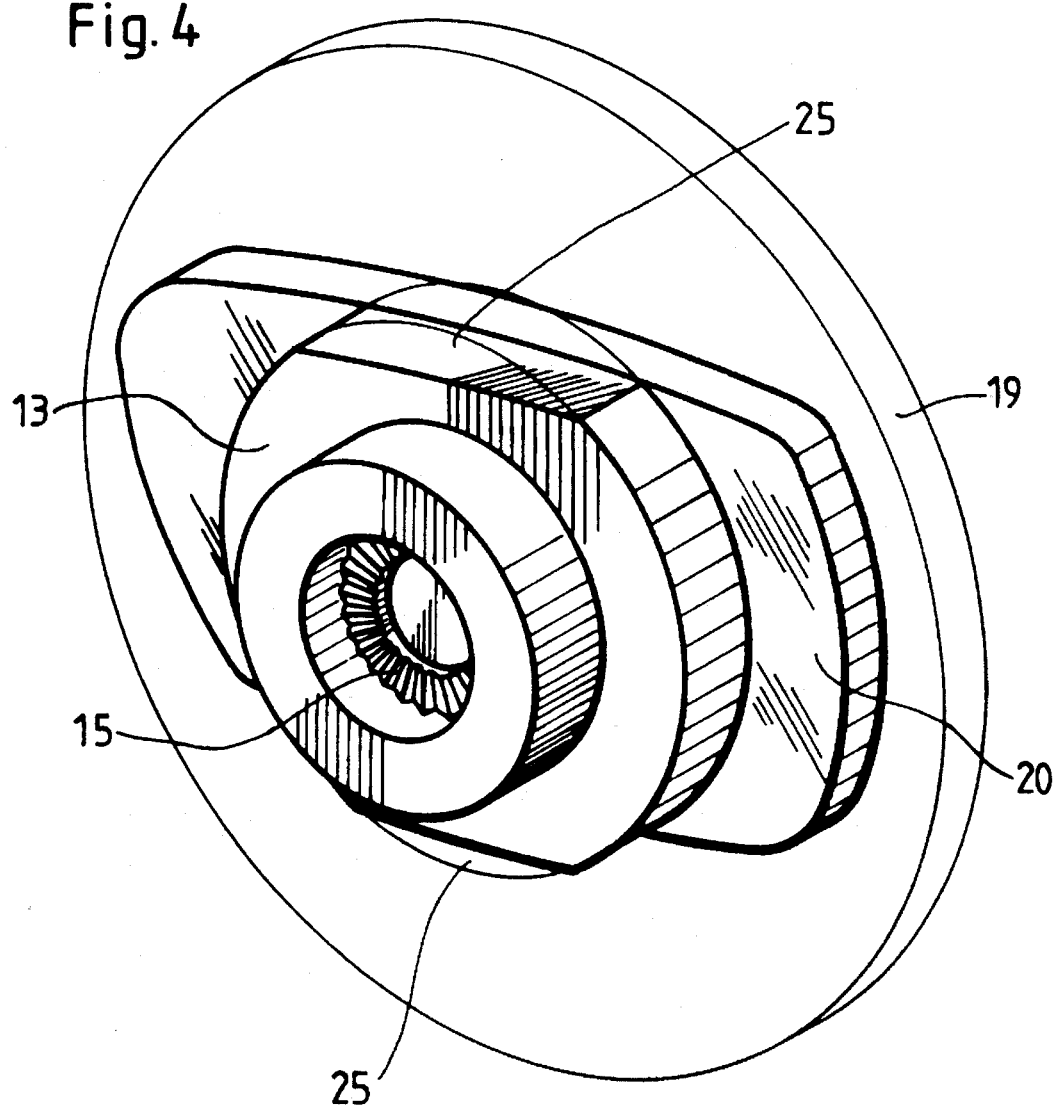
FIG. 4 is an enlarged perspective view of the block or sucker as shown mounted in the machine of FIGS. 1 and 2.

After the machining operation of the optical surface has been completed the pair of arms 11 are pivoted under the control of the control unit 24 into the operative range of the edging tool 8 until the eyeglass lens blank 19 comes into initial contact with a cylindrical area of the edging tool 8. Also under the control of the control unit 24, the second shaft 17 is moved toward the lens blank 19 so as to clamp the semi-finished lens blank 19 with the block or sucker 18 against the remaining free optical surface of the eyeglass lens blank 19, whereafter the machining operation of the lens edge begins. The shafts 16, 17 rotate slowly while the pair of arms 11 rise and fall in accordance with the outline of the eyeglass lens to be ground, all under the control of the control unit 24, until the outline of the finished eyeglass lens 20 has been machined. If the finished eyeglass lens 20 is to be bevelled, which is as a rule required when the eyeglass lens is to be mounted in a standard eyeglass frame, the motor 4 with the carriage 5 on the guide rods 6 is shifted, again under the control of the control unit 24, until the V-groove at the edging tool 8 has been moved into the range of the eyeglass lens 20. Now the eyeglass lens 20 will be set in slow rotation by the coordinated movement of the shafts 16, 17, while the edging tool 8 is driven by the motor 4 at a fast rotational speed. To ensure that the course of the bevel follows the eyeglass lens outline and maintains the desired position in reference to the front surface of the eyeglass lens 20, the edging tool 8 together with the motor 4, again under the control of the control unit 24, are shifted in the direction indicated by the double arrow in FIG. 2 so that a bevel will be machined along the desired course without this course being influenced by the block or the sucker 13. The block or sucker 13 will at least in certain peripheral regions also be worn away at the same time. Once the machining operation of the eyeglass lens 20 has been completed, the block or sucker 13 is detached from the eyeglass lens 20 and disposed of.

Note should further be made of the fact that the machine for processing the optical surfaces and the edge of eyeglass lenses can also be operated without an electronic CNC control unit 24 if the individual processing steps are initiated manually and the eyeglass lens outline is machined by copying from a template positioned on the shaft sections 16, 17.

The invention is not limited to the embodiment illustrated and described herein of a process and a machine for machining the optical surfaces and the edge of eyeglass lens blanks, but is intended to include concepts for edging eyeglass lens blanks only, and a process and machine for machining the optical surfaces and the edge by means of separate mutually independent machines using a block or sucker which is worn away during edging and then is not reused.

What I claim is:

1. A process for edging an eyeglass lens blank to make it correspond to a non-circular contour of a lens receiving opening of a preselected eyeglass frame including the following steps:

a) attaching a major surface of an eyeglass blank on a block or sucker, the diameter of said block or sucker being transversely overall dimensioned so as to have the same or a smaller transverse dimension than the diameter of the eyeglass lens blank outline but also exceeding at least partially the contour of the lens receiving opening of the preselected eyeglass frame in certain regions of said block or sucker;

b) inserting said block or sucker into a holder of a device for machining the optical surface of the eyeglass lens blank;

c) machining the optical surface of said lens blank to a semi-finished eyeglass lens;

d) edging the semi-finished eyeglass lens in said device for machining the optical surface of the eyeglass lens blank or in a separate second device for edging only the edge of the semi-finished eyeglass lens blank in accordance with a preselected peripheral outline corresponding to said non-circular lens receiving opening of said eyeglass frame, while simultaneously also edging in said same step at least a portion of said block or sucker in said device or second device, thereby producing a finished lens;

e) machining of a bevel or groove on said eyeglass lens edge under positive control and with reference to said optical surface and/or said preselected eyeglass frame opening, and f) detaching said block or sucker from the finished eyeglass lens and disposing of said block or sucker.

2. A process for edging an eyeglass lens blank to make it correspond to a non-circular contour of a lens receiving opening of a preselected eyeglass frame including the following steps:

a) attaching to a major surface of an eyeglass lens blank a block or sucker, said block or sucker being transversely overall dimensioned so as to have the same or a smaller transverse dimension than the diameter of the eyeglass lens blank outline but exceeding at least partially the contour of the lens receiving opening of the preselected eyeglass frame;

b) inserting the block or sucker into a holder of a device for machining the edge of the eyeglass lens blank;

c) machining the edge of the eyeglass lens in accordance with a preselected peripheral outline corresponding to said non-circular lens receiving opening of said eyeglass frame while simultaneously also machining at least a portion of said block or sucker;

d) machining of a bevel or groove on said eyeglass lens edge under positive control and with reference to said optical surface and/or said preselected eyeglass frame opening, and e) detaching said block or sucker from the finished eyeglass lens and disposing of said block or sucker.

* * * * *